(12) United States Patent
Li

(10) Patent No.: US 10,650,502 B2
(45) Date of Patent: May 12, 2020

(54) IMAGE PROCESSING METHOD AND APPARATUS, AND STORAGE MEDIUM

(71) Applicant: Beijing Xiaomi Mobile Software Co., Ltd., Beijing (CN)

(72) Inventor: Guosheng Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 234 days.

(21) Appl. No.: 15/835,842

(22) Filed: Dec. 8, 2017

(65) Prior Publication Data

US 2018/0165802 A1 Jun. 14, 2018

(30) Foreign Application Priority Data

Dec. 12, 2016 (CN) .......................... 2016 1 1140243

(51) Int. Cl.
*G06T 5/00* (2006.01)
*G09G 5/02* (2006.01)
(Continued)

(52) U.S. Cl.
CPC ............... *G06T 5/009* (2013.01); *G06T 5/40* (2013.01); *G09G 3/2003* (2013.01); *G09G 5/026* (2013.01);
(Continued)

(58) Field of Classification Search
CPC ........... G06T 5/009; G06T 5/40; G09G 5/026; G09G 3/2003; G09G 2360/16;
(Continued)

(56) References Cited

U.S. PATENT DOCUMENTS 6,577,775 B1* 6/2003 Li ........................... G06T 5/007
358/446
9,858,850 B2* 1/2018 Lin ....................... G09G 3/2007
(Continued)

FOREIGN PATENT DOCUMENTS

CN 101308574 A 11/2008
CN 10450372 A 8/2015
(Continued)

OTHER PUBLICATIONS

Computer English Translation of Japanese Patent No. 2014-010576. (Year: 2014).*

(Continued)

*Primary Examiner* — Daniel G Mariam
(74) *Attorney, Agent, or Firm* — Arch & Lake LLP

(57) ABSTRACT

An image processing method and apparatus, and a storage medium are provided in the technical field of display. The method may include: acquiring pixel data of an image to be processed; acquiring a histogram of the image according to the pixel data, the histogram indicating a pixel number under each grey scale; obtaining a target grey scale set by using in the histogram a grey scale whose pixel number exceeds a preset pixel number; selecting, from the image, a target pixel whose grey scale belongs to the target grey scale set from the image; and performing a color inversion operation to the target pixel. The color inversion operation is performed to the background pixels and character pixels. Thus, the image grey scales may be reduced while maintaining the contrast of the image, and influence to the image definition by the grey scales is reduced.

17 Claims, 4 Drawing Sheets

(51) Int. Cl.
   *G09G 3/20*   (2006.01)
   *H04N 5/20*   (2006.01)
   *G06T 5/40*   (2006.01)

(52) U.S. Cl.
   CPC ......... *H04N 5/20* (2013.01); *G09G 2320/066* (2013.01); *G09G 2320/0686* (2013.01); *G09G 2340/14* (2013.01); *G09G 2360/144* (2013.01); *G09G 2360/16* (2013.01)

(58) Field of Classification Search
   CPC ....... G09G 2360/144; G09G 2320/066; G09G 2320/0686; G09G 2340/14
   USPC ......................................................... 382/167
   See application file for complete search history.

(56) References Cited

U.S. PATENT DOCUMENTS

| | | | |
|---|---|---|---|
| 2006/0204124 A1* | 9/2006 | Aihara | ................... G06T 5/008 382/274 |
| 2007/0024656 A1 | 2/2007 | Nakamura | |
| 2009/0161138 A1 | 6/2009 | Nakamura | |
| 2009/0245632 A1 | 10/2009 | Ovsiannikov | |
| 2014/0016880 A1 | 1/2014 | Kerofsky | |
| 2014/0307117 A1* | 10/2014 | Feng | ................... H04N 5/2355 348/218.1 |
| 2015/0332444 A1* | 11/2015 | Tsuda | ................... H04N 1/407 382/167 |
| 2016/0267346 A1 | 9/2016 | Jain | |

FOREIGN PATENT DOCUMENTS

| | | |
|---|---|---|
| CN | 105046663 A | 11/2015 |
| EP | 2983351 A1 | 2/2016 |
| JP | 2008148050 A | 6/2008 |
| TW | 201606732 A | 2/2016 |

OTHER PUBLICATIONS

Chinese Second Office Action issued in corresponding Chinese Application No. 201611140243.0 dated Mar. 4, 2019.
Chinese First Office Action (including English translation) issued in corresponding CN Patent Application No. 201611140243.0 dated Jun. 13, 2018, 10 pages.
Extended European Search Report of EP Patent Application No. 17206614.4 dated Mar. 22, 2018, 10 pages.

* cited by examiner

IMAGE PROCESSING METHOD AND APPARATUS, AND STORAGE MEDIUM

CROSS REFERENCE TO RELATED APPLICATION

This application is based on and claims priority to Chinese Patent Application No. 201611140243.0, filed on Dec. 12, 2016, which is incorporated herein by reference in its entirety.

TECHNICAL FIELD

The present disclosure is related to the technical field of display, and more particularly, to an image processing method and apparatus, and a storage medium.

BACKGROUND

With development of display technologies, images are displayed in increasingly varied ways. The illumination of the displayed image can be changed. As an image consists of pixels, and a grey scale of a pixel represents an illumination level of the pixel, a terminal device can display a pixel in an image at a certain grey scale so as to control the illumination of the image.

However, when the environment becomes dark, the image displayed by the terminal device is usually striking. To protect the user's eyes, it needs to reduce the grey scales of the pixels in the image to thereby reduce the illumination of the image.

However, the contrast of the image is determined by the difference between different pixel grey scales. When the terminal device reduces the pixel grey scales of the image, the difference between different pixel grey scales is also reduced. As a result, the contrast of the image is reduced, and the definition level of the image is affected.

SUMMARY

To solve the problems in the related technologies, the present disclosure provides an image processing method and apparatus, and a storage medium. The technical solutions are as below.

According to a first aspect of the present disclosure, there is provided an image processing method. The method may include: acquiring pixel data of an image to be processed, the pixel data comprising position information and a grey scale of each pixel; acquiring a histogram of the image according to the pixel data, the histogram indicating a pixel number under each grey scale; obtaining a target grey scale set by using in the histogram a grey scale whose pixel number exceeds a preset pixel number; selecting, from the image, a target pixel whose grey scale belongs to the target grey scale set; and performing a color inversion operation to the target pixel.

According to a second aspect of the present disclosure, there is provided an image processing apparatus. The apparatus may include: a histogram acquiring module configured for acquiring pixel data of an image to be processed, the pixel data comprising position information and a grey scale of each pixel, and for acquiring a histogram of the image according to the pixel data, the histogram indicating a pixel number under each grey scale; a grey scale set acquiring module configured for obtaining a target grey scale set by using a grey scale in the histogram whose pixel number exceeds a preset pixel number; a selecting module configured for selecting a target pixel whose grey scale belongs to the target grey scale set from the image; and a color inverting module configured for performing a color inversion operation to the target pixel.

According to a third aspect of the present disclosure, there is provided an image processing apparatus. The apparatus may include: a processor, and a memory configured for storing instructions executable by the processor. The processor is configured for: acquiring pixel data of an image to be processed, the pixel data comprising position information and a grey scale of each pixel; acquiring a histogram of the image according to the pixel data, the histogram indicating a pixel number under each grey scale; obtaining a target grey scale set by using in the histogram a grey scale whose pixel number exceeds a preset pixel number; selecting, from the image, a target pixel whose grey scale belongs to the target grey scale set; and performing a color inversion operation to the target pixel.

According to a fourth aspect of the present disclosure, there is provided a non-transitory computer-readable storage medium having stored therein instructions that, when executed by a processor of a mobile terminal, causes the mobile terminal to perform acts including: acquiring pixel data of an image to be processed, the pixel data comprising position information and a grey scale of each pixel; acquiring a histogram of the image according to the pixel data, the histogram indicating a pixel number under each grey scale; obtaining a target grey scale set by using in the histogram a grey scale whose pixel number exceeds a preset pixel number; selecting, from the image, a target pixel whose grey scale belongs to the target grey scale set; and performing a color inversion operation to the target pixel.

It should be understood that both the foregoing general description and the following detailed description are only exemplary and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

In order to make the objects, the technical solutions and advantages more clear, the present disclosure will be described in further detail with reference to the embodiments and the accompany drawings. Here, the illustrative embodiments of the present disclosure and the description thereof are not intended to limit the present disclosure, but to explain the present disclosure.

Embodiments of the present disclosure provide an image processing method and apparatus, which will be described in detail with reference to the drawings.

Figure 1:
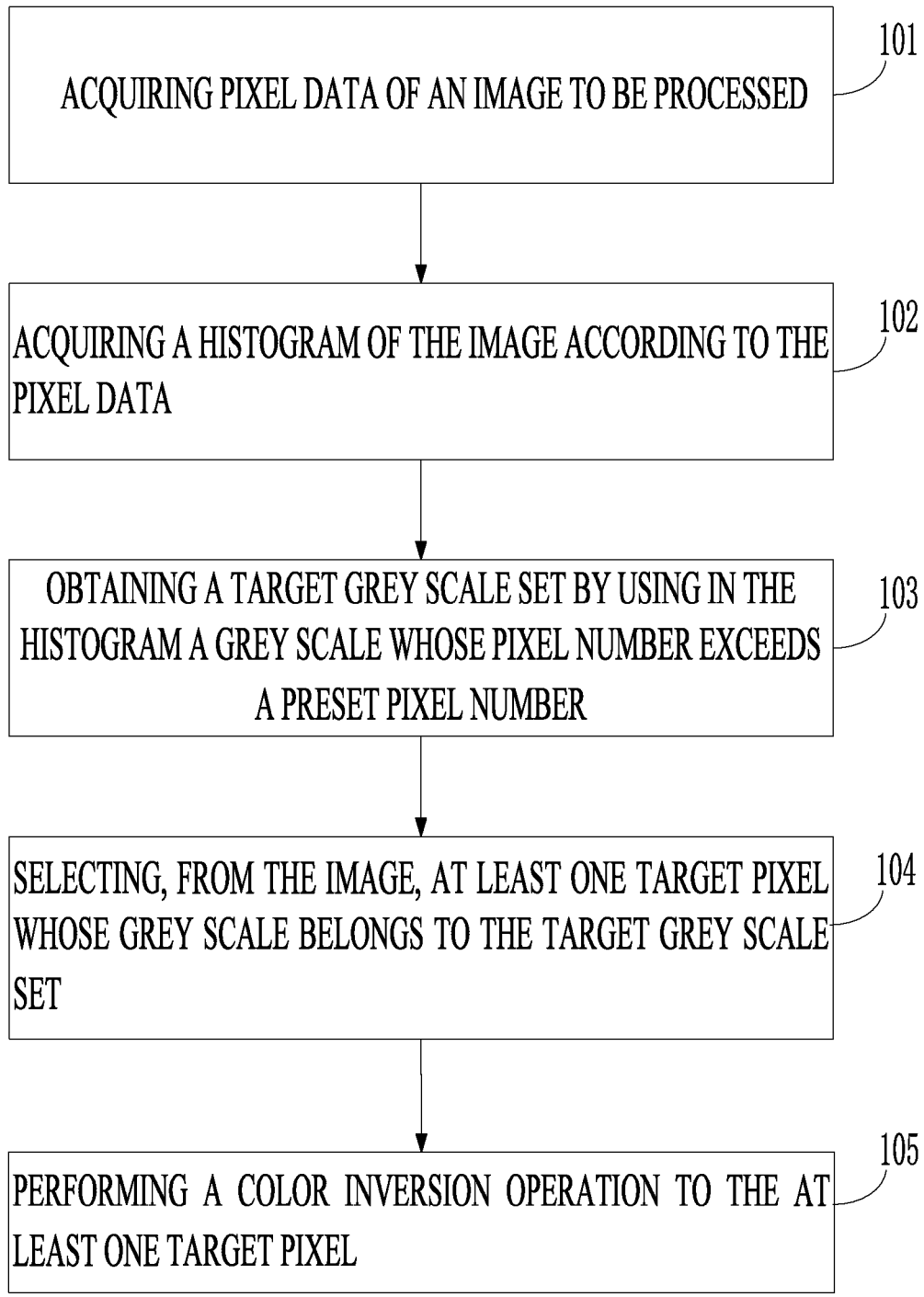
FIG. 1 is a flow chart of an image processing method according to an aspect of the present disclosure.

FIG. 1 is a flow chart of an image processing method according to an aspect of the present disclosure. As shown in FIG. 1, the method is applied in a terminal device and includes the following steps.

Step 101 includes acquiring pixel data of an image to be processed, the pixel data comprising position information and a grey scale of each pixel.

Step 102 includes acquiring a histogram of the image according to the pixel data, the histogram indicating a pixel number under each grey scale. For example, the x-axis of the histogram may indicate different grey scales while the y-axis of the histogram may indicate the number of pixels for each gray scale, where the number of pixels may be referred as the pixel number in this disclosure.

Step 103 includes obtaining a target grey scale set by using a grey scale in the histogram whose pixel number exceeds a preset pixel number.

Step 104 includes selecting at least one target pixel whose grey scale belongs to the target grey scale set from the image.

Step 105 includes performing a color inversion operation to the at least one target pixel.

Using the method provided by the present disclosure, the device may acquire pixel data of an image to be processed. The device acquires a histogram of the image according to the pixel data. The device may obtain a target grey scale set by using in the histogram a grey scale whose pixel number exceeds a preset pixel number. The device then selects, from the image, a target pixel whose grey scale belongs to the target grey scale set. The device may perform a color inversion operation to the target pixel. Thus, the present disclosure uses the feature that the pixel numbers of background pixels and character pixels in an image are relatively large, so that the device may extract background pixels and character pixels according to the pixel number under each grey scale in the histogram. Then, a color inversion operation is performed to the background pixels and character pixels. Thus, the image grey scales can be reduced while maintaining the contrast of the image, and influence to the image definition by the grey scales is reduced.

In a possible implementation manner, selecting from the image the at least one target pixel whose grey scale belongs to the target grey scale set may include: selecting multiple pixels whose grey scales belong to the target grey scale set from the image; and selecting a pixel whose grey scale is greater than a first preset grey scale from the multiple pixels as the target pixel.

In another possible implementation manner, selecting from the image the at least one target pixel whose grey scale belongs to the target grey scale set v: selecting multiple pixels whose grey scales belong to the target grey scale set from the image; and when more than a first number pixels among the multiple pixels constitute a continuous pixel region, taking each pixel in the continuous pixel region as the target pixel, the first number defining a minimum continuous pixel number of background pixels.

In yet another possible implementation manner, selecting from the image the at least one target pixel whose grey scale belongs to the target grey scale set may include: selecting multiple pixels whose grey scales belong to the target grey scale set from the image; and selecting a pixel whose grey scale is smaller than a second preset grey scale from the multiple pixels as the target pixel.

In yet another possible implementation manner, selecting from the image the at least one target pixel whose grey scale belongs to the target grey scale set may include: selecting multiple pixels whose grey scales belong to the target grey scale set from the image; and when less than a second number pixels among the multiple pixels constitute a continuous pixel region, taking each pixel in the continuous pixel region as the target pixel, the second number defining a maximum continuous pixel number of character pixels.

In yet another possible implementation manner, performing the color inversion operation to the target pixel may include: determining a grey scale of each sub-pixel in the target pixel; and for each sub-pixel in the target pixel, calculating a difference between a preset maximum grey scale and the grey scale of each sub-pixel, and taking the difference as the grey scale of the sub-pixel after the color inversion so as to invert a color of the target pixel.

In yet another possible implementation manner, before performing the color inversion operation to the target pixel, the method further may include: acquiring multiple histograms of the image, the multiple histograms corresponding to multiple colors, and each histogram indicating a pixel number of a corresponding color under each grey scale of the image; for each of the multiple histograms, obtaining a target grey scale set by using in the histogram a grey scale whose pixel number exceeds a preset pixel number, and selecting, from the image, a pixel whose grey scale belongs to the target grey scale set to form a pixel set; and taking a pixel respectively included in multiple pixel sets determined according to the multiple histograms as the target pixel.

Any combination of all the above optional technical solutions may form an optional embodiment of the present embodiment, which will not be repeated herein.

Figure 2:
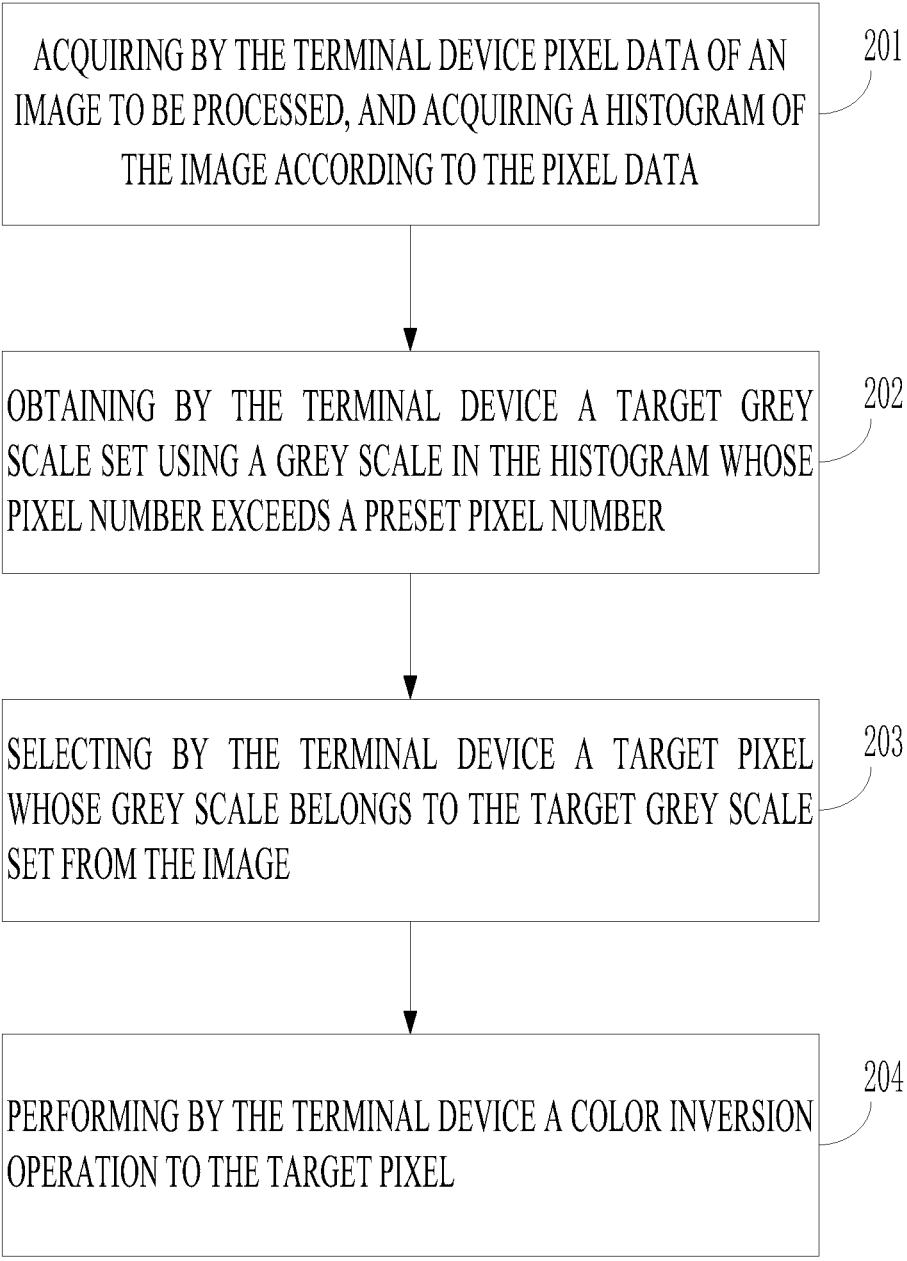
FIG. 2 is a flow chart of an image processing method according to another aspect of the present disclosure.

FIG. 2 is a flow chart of an image processing method according to another aspect of the present disclosure. As shown in FIG. 2, the method is applied in a terminal device and includes the following steps.

Step 201 includes acquiring by the terminal device pixel data of an image to be processed, and acquiring a histogram of the image according to the pixel data.

The terminal device may be a cell phone, a computer or the like. The image may be any image displayed by the terminal device, and may be a photo, a webpage or the like. The webpage may be an operating system webpage, an application webpage or the like, which will not be limited in the present embodiment.

The image consists of multiple pixels. The pixel data of the image includes position information and a grey scale of each pixel. The terminal device may establish a coordinate system for the image. The position information may be represented by the coordinates of the pixel in the coordinate system. For example, if the coordinates of the pixel are (400, 300), it can be determined that the pixel is in the $400^{th}$ row and the $300^{th}$ column of the image.

The histogram represents a pixel number under each grey scale. After the terminal device acquires the image to be processed, a grey scale of each pixel may be determined by traversing each pixel in the image. For any pixel, the higher the grey scale of the pixel, the brighter the pixel will look.

After determining the grey scale of each pixel in the image, the terminal device may count the pixel number under each grey scale, and draw a histogram of the image. The histogram indicates the pixel number under each grey scale.

The horizontal coordinate of the histogram represents the grey scales, and the vertical coordinate represents the pixel numbers of the image under each grey scale. When the pixel number under a certain grey scale among multiple grey scales in the histogram is the largest, a peak is formed at the grey scale in the histogram.

Step 202 includes obtaining by the terminal device a target grey scale set by using in the histogram a grey scale whose pixel number exceeds a preset pixel number.

Considering that any image consists of three types of pixels, namely, background pixels, character pixels and picture pixels, in an actual scene, background pixels and character pixels account for relatively larger proportions in an image, while picture pixels account for a relatively smaller proportion in all the pixels of the image. Therefore, the background and character pixels should be focused when reducing the grey scales of the image.

Among the background and character pixels, usually the background pixels have relatively higher grey scales, and look brighter, so they are the key affecting the grey scales of the image, and can be taken as target pixels. When reducing the grey scales of the image, a color inversion operation is performed to the background pixels to reduce the grey scales of the image. On the other hand, usually character pixels have relatively lower grey scales and look darker. Although character pixels do not affect the grey scales of the image, to allow a user to distinguish background pixels from character pixels and to clearly recognize the character pixels, when performing the color inversion operation to the background pixels, character pixels also need to be regarded as target pixels so that the color inversion operation can be applied to the character pixels.

As both background pixels and character pixels account for larger proportions in the image, or usually the pixel numbers of background pixels and character pixels are relatively larger, the terminal device may set a preset pixel number. When the pixel number of any grey scale exceeds the preset pixel number, the pixels corresponding to the grey scale can be regarded as background or character pixels.

The terminal device may acquire the pixel number under each grey scale in the histogram, and compare the pixel number under each grey scale with the preset pixel number. When it determines that the pixel number under a grey scale exceeds the preset pixel number, the grey scale is taken as a target grey scale. When acquiring one or more target grey scales whose pixel numbers exceed the preset pixel number, the one or more target grey scales can form a target grey scale set.

Step 203 includes selecting by the terminal device a target pixel whose grey scale belongs to the target grey scale set from the image.

The terminal device may determine the grey scale of each pixel in the image, and determine if the grey scale belongs to the target grey scale set. When the grey scale of a pixel belongs to the target grey scale set, the pixel can be taken as a target pixel. The terminal device may acquire the grey scale of each pixel by line-scanning, row-scanning or the like, which will not be limited in the present embodiment.

Considering in actual application that background and character pixels account for larger proportions in the image, have larger pixel numbers, and can be selected in grey scale size and continuity level, to determine if a pixel in the image is a background or character pixel more accurately, step 203 may further include steps 2031-2032 for determining a background pixel and steps 2033-2034 for determining a character pixel as below.

Step 2031 includes selecting by the terminal device multiple pixels whose grey scales belong to the target grey scale set from the image, and selecting by the terminal device a pixel whose grey scale is greater than a first preset grey scale from the multiple pixels as the target pixel.

Considering that usually a background pixel has a relatively higher grey scale and looks relatively brighter, the terminal device may determine a first preset grey scale. After selecting multiple pixels whose grey scales belong to the target grey scale set from the image, the terminal device may determine if the grey scale of each of the multiple pixels is greater than the first preset grey scale, and determine that the pixel is bright enough and can be taken as a background pixel and as a target pixel when the grey scale of the pixel is greater than the first preset grey scale.

The first preset grey scale defines the minimum grey scale of a background pixel, for example, 240, which will not be limited in the present embodiment.

Step 2032 includes selecting by the terminal device multiple pixels whose grey scales belong to the target grey scale set from the image, and when more than a first number pixels among the multiple pixels constitute a continuous pixel region, taking each pixel in the continuous pixel region as the target pixel.

Considering that in an actual image, usually background pixels will form a continuous pixel region of a relatively large area, that is, a lot of background pixels may form a continuous pixel region, after selecting multiple pixels whose grey scales belong to the target grey scale set from the image, the terminal device may select, from the multiple pixels, several pixels that constitute a continuous pixel region. When the number of the several pixels is greater than the first number, each pixel in the several pixels can be regarded as a background pixel and can be taken as a target pixel.

The continuous pixel region means a pixel region formed by multiple pixels whose positions are adjacent to one another. For example, the continuous pixel region may have a horizontal shape, each two pixels are adjacent to each other in the horizontal direction, and all the pixels in the area are lined to form a shape of "→". Alternatively, the continuous pixel region may have a vertical shape, each two pixels are adjacent to each other in the vertical direction, and all the pixels in the area are lined to form a shape of "|". Alternatively, the continuous pixel region may have a block shape and includes multiple continuous pixels in both the horizontal and vertical directions, and all the pixels in the area are arranged to form a shape of a rectangle or square.

To determine if any two pixels are continuous, the terminal device needs to determine if the positions of the two pixels are adjacent to each other. For a random pixel, a pixel adjacent to that pixel may include the first pixel above that pixel, the first pixel below that pixel, the first pixel on the left and the first pixel on the right.

The terminal device may acquire the pixel data of each of the multiple pixels, and determine if any two pixels are adjacent to each other based on the position information of each pixel. For example, the terminal device may determine the pixel coordinates of each pixel based on the position information of each pixel, and regards the pixels corresponding to two pairs of pixel coordinates to be continuous when the difference between the horizontal coordinates of two pixels is a unit pixel width and the vertical coordinates of the two pixels are the same or when the horizontal coordinates of two pixels are the same and the difference between the vertical coordinates of the two pixels is a unit pixel height.

After determining the multiple pixels to be continuous pixels using this method, the terminal device may acquire a number of the multiple pixels, and determine if the number of the multiple pixels is greater than the first number to determine if the multiple pixels are background pixels. The first number defines a minimum continuous pixel number of background pixels, for example, 100, which will not be limited in the present embodiment.

It should be noted that steps 2031-2032 may be combined to form a solution of selecting target pixels. That is, the terminal device may select multiple pixels whose grey scales belong to the target grey scale set from the image, and select, from the multiple pixels, several pixels whose grey scales are greater than the first preset grey scale and whose pixel number forming a continuous pixel region is greater than the first number as target pixels.

When the terminal device selects the target pixels using this method, as the selected target pixels have the three features of background pixels including a relatively larger proportion in the image, relatively higher grey scales and a larger area of continuous pixel region being formed, the terminal device can accurately acquire background pixels from the image.

Step 2033 includes selecting by the terminal device multiple pixels whose grey scales belong to the target grey scale set from the image, and selecting by the terminal device a pixel whose grey scale is smaller than a second preset grey scale from the multiple pixels as the target pixel.

Considering that usually a character pixel has a relatively lower grey scale and looks relatively darker, the terminal device may determine a second preset grey scale. After selecting multiple pixels whose grey scales belong to the target grey scale set from the image, the terminal device may determine if the grey scale of each of the multiple pixels is smaller than the second preset grey scale, and determine that the pixel is dark enough and can be taken as a character pixel and as a target pixel when the grey scale of the pixel is smaller than the second preset grey scale.

The second preset grey scale defines the maximum grey scale of a character pixel, for example, 20, which will not be limited in the present embodiment.

Step 2034 includes selecting by the terminal device multiple pixels whose grey scales belong to the target grey scale set from the image, and when less than a second number pixels among the multiple pixels constitute a continuous pixel region, taking by the terminal device each pixel in the continuous pixel region as the target pixel.

In an actual image, usually character pixels form at least one continuous pixel region, each being a letter, a number, a character or the like. Usually, the area of the continuous pixel region is very small, or the continuous pixel region includes few pixels. For example, when the character pixel includes Chinese characters in font No. 4, there are only 18 pixels in a continuous pixel region formed by a Chinese character in font No. 4.

Therefore, after selecting multiple pixels whose grey scales belong to the target grey scale set from the image, the terminal device may select several pixels forming a continuous pixel region from the multiple pixels, and take each of the several pixels as a character pixel and as the target pixel when the number of the several pixels is smaller than the second number.

The terminal device may acquire the pixel data of each of the several pixels, and determine if any two pixels are adjacent to each other based on the position information of each pixel. For example, the terminal device may determine the pixel coordinates of each pixel based on the position information of each pixel, and regards the pixels corresponding to two pairs of pixel coordinates to be continuous when the difference between the horizontal coordinates of two pixels is a unit pixel width and the vertical coordinates of the two pixels are the same or when the horizontal coordinates of two pixels are the same and the difference between the vertical coordinates of the two pixels is a unit pixel height.

After determining the several pixels to be continuous pixels using this method, the terminal device may acquire a number of the several pixels, and determine if the number of the several pixels is smaller than the second number to determine if the several pixels are character pixels. The second number defines a maximum continuous pixel number of character pixels, for example, 20, which will not be limited in the present embodiment.

It should be noted that steps 2033-2034 may be combined to form a solution of selecting target pixels. That is, the terminal device may select multiple pixels whose grey scales belong to the target grey scale set from the image, and select, from the multiple pixels, several pixels whose grey scales are smaller than the second preset grey scale and whose pixel number forming a continuous pixel region is smaller than the second number as target pixels.

When the terminal device selects the target pixels using this method, as the selected target pixels have the three features of character pixels including a relatively larger proportion in the image, relatively lower grey scales and a smaller area of continuous pixel region being formed, the terminal device can accurately acquire character pixels from the image.

It should be noted that any pixel may include sub-pixels of various colors, so the terminal device may acquire multiple histograms of the image corresponding to various colors, each histogram indicating a pixel number under each grey scale of a corresponding color in the image. For each of the multiple histograms, the terminal device may obtain a target grey scale set using a grey scale in the histogram whose pixel number exceeds a preset pixel number, select a pixel whose grey scale belongs to the target grey scale set from the image to form a pixel set, and take a pixel respectively included in multiple pixel sets determined according to the multiple histograms as the target pixel.

For example, each pixel in the image includes sub-pixels of three colors including red sub-pixels, green sub-pixels and blue sub-pixels. The terminal device respectively count the numbers of red sub-pixels, green sub-pixels and blue sub-pixels under each grey scale of the image to obtain a red color histogram, a green color histogram and a blue color histogram.

The terminal device may form or obtain a first target grey scale set using a grey scale whose pixel number exceeds a preset pixel number in the red color histogram, and select the pixels of the image whose grey scales belong to the first target grey scale set to form a first pixel set. The terminal device may form or obtain a second target grey scale set using a grey scale whose pixel number exceeds the preset pixel number in the green color histogram, and select the pixels of the image whose grey scales belong to the second target grey scale set to form a second pixel set. The terminal device may form or obtain a third target grey scale set using a grey scale whose pixel number exceeds a preset pixel number in the blue color histogram, and select the pixels of the image whose grey scales belong to the third target grey scale set to form a third pixel set. Then, the intersection of the first to third sets may be selected, and each pixel in the intersection is taken as a target pixel.

Step 204 includes performing by the terminal device a color inversion operation to the target pixel.

The terminal device may determine the grey scale of each sub-pixel of the target pixel. For each sub-pixel of the target pixel, the terminal device may calculate a difference between a preset maximum grey scale and the grey scale of each sub-pixel, and take the difference as the grey scale of the sub-pixel after performing the color inversion, so that when the target pixel is displayed according to the calculated grey scale, the target scale will display a totally opposite color.

The preset maximum grey scale refers to the maximum grey scale of the sub-pixel. When the sub-pixel has 256 grey scales of 0-255, the preset maximum grey scale is 255. The grey scale of a red sub-pixel in the target pixel is r, the grey scale of a green sub-pixel in the target pixel is g, and the grey scale of a blue sub-pixel in the target pixel is b. After the color inversion, the grey scale of the red sub-pixel in the target pixel is 255-r, the grey scale of the green sub-pixel in the target pixel is 255-g, and the grey scale of the blue sub-pixel in the target pixel is 255-b. For example, when the target pixel is a white pixel, r=g=b=0. After the color inversion, the target pixel becomes a black pixel, and r=g=b=255.

In this embodiment, after color inversion of the relatively brighter background pixels and the relatively darker character pixels in the image, the background pixels of the image become dark, while the character pixels in the image become bright. On one hand, the grey scales of the image are reduced. On the other hand, as the contrast of the image is determined by the difference between different pixel grey scales, after color inversion of the background pixels and character pixels, the difference between the two types of pixels slightly changes, the contrast will not be reduced, and the definition of the image will not be affected. In addition, background pixels can be clearly distinguished from character pixels, so that the user can recognize character pixels from the background pixels.

For example, for image of electronic books, to allow the user to clearly recognize character pixels from the background pixels, usually the background pixels are white pixels, and the character pixels are black pixels. When the white pixels in the image are color-inverted to black pixels, and the black pixels in the image are color-inverted to white pixels, the background of the image turns from white to black. The grey scales of the image are reduced. The characters in the image turn from black to white, which greatly differs from the black ground, so the contrast is high, and the user can read normally.

It should be noted that usually the color pixels in the image are picture pixels. On one hand, picture pixels account for a relatively smaller proportion in the image, and little affect the grey scales of the image. On the other hand, after color inversion of the picture pixels, the picture may be distorted, and the visual effect of the image deteriorates. Therefore, color inversion is not applied to picture pixels in the present embodiment.

With the method provided by the present embodiment, by acquiring pixel data of an image to be processed; acquiring a histogram of the image according to the pixel data; obtaining a target grey scale set by using in the histogram a grey scale whose pixel number exceeds a preset pixel number; selecting a target pixel whose grey scale belongs to the target grey scale set from the image; and performing a color inversion operation to the target pixel, the present disclosure sufficiently considers the feature that the pixel numbers of background pixels and character pixels in an image are relatively large, so that the background pixels and character pixels can be extracted according to the pixel number under each grey scale in the histogram. Then, a color inversion operation is performed to the background pixels and character pixels. Thus, the image grey scales can be reduced while maintaining the contrast of the image, and influence to the image definition by the grey scales is reduced.

Meanwhile, only the background and character pixels are treated with color inversion, and the picture pixels are not treated, so that the user can clearly distinguish background pixels from character pixels, and can clearly recognize character pixels. Further, picture pixels will not be distorted, avoiding influence to the aesthetic feeling of the image by grey scales.

In addition, the method provided by the present embodiment is applicable for not only operating system images of a processing terminal device but also images of various applications installed in the processing terminal device. Thus, the needs for reducing the grey scales of various images are met, the functionality of a terminal device is extended, and the flexibility of the terminal device is improved.

Further, the following features of background pixels are considered: a relatively larger pixel number in the image, relatively higher grey scales and a larger area of continuous pixel region being formed. The following features of character pixels are considered: a relatively larger pixel number in the image, relatively lower grey scales and a smaller area of continuous pixel region being formed. By selecting the pixels in the image based on the above features, background and character pixels can be accurately extracted from the image.

Figure 3:
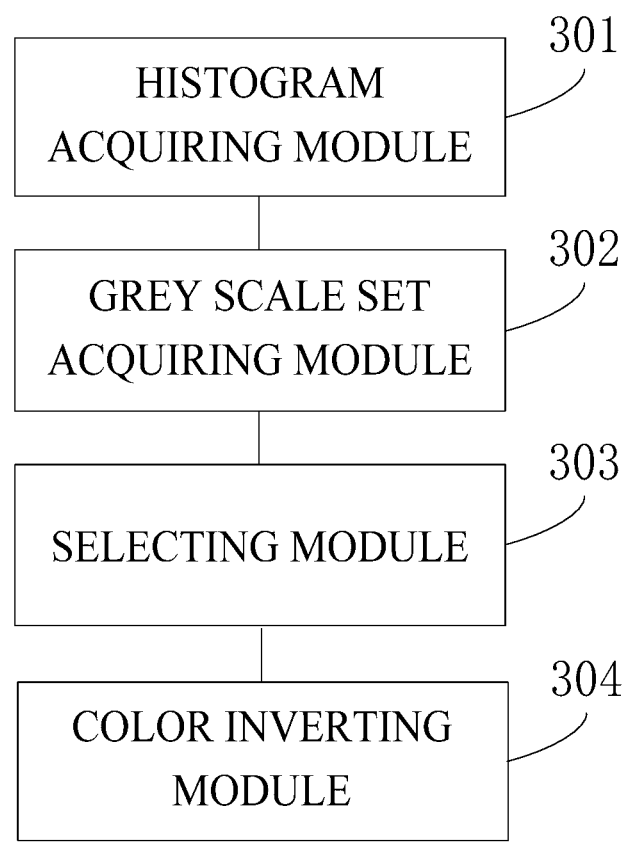
FIG. 3 is a block diagram of an image processing apparatus according to an aspect of the present disclosure.

FIG. 3 is a block diagram of an image processing apparatus according to an embodiment of the present disclosure. Referring to FIG. 3, the image processing apparatus includes a histogram acquiring module 301, a grey scale set acquiring module 302, a selecting module 303 and a color inverting module 304.

The histogram acquiring module 301 is configured for acquiring pixel data of an image to be processed, the pixel data comprising position information and a grey scale of each pixel, and for acquiring a histogram of the image according to the pixel data, the histogram indicating a pixel number under each grey scale.

The grey scale set acquiring module 302 is configured for obtaining a target grey scale set by using in the histogram a grey scale whose pixel number exceeds a preset pixel number.

The selecting module 303 is configured for selecting a target pixel whose grey scale belongs to the target grey scale set from the image.

The color inverting module 304 is configured for performing a color inversion operation to the target pixel.

Using the apparatus provided by the present embodiment, by acquiring pixel data of an image to be processed; acquiring a histogram of the image according to the pixel data; obtaining a target grey scale set by using in the histogram a grey scale whose pixel number exceeds a preset pixel number; selecting, from the image, a target pixel whose grey scale belongs to the target grey scale set; and performing a color inversion operation to the target pixel, the present disclosure sufficiently considers the feature that the pixel numbers of background pixels and character pixels in an image are relatively large, so that the background pixels and character pixels can be extracted according to the pixel number under each grey scale in the histogram. Then, a color inversion operation is performed to the background pixels and character pixels. Thus, the image grey scales can be reduced while maintaining the contrast of the image, and influence to the image definition by the grey scales is reduced.

In a possible implementation manner, the selecting module 303 may include: a selecting sub-module configured for selecting multiple pixels whose grey scales belong to the target grey scale set from the image; and a determining sub-module configured for selecting a pixel whose grey scale is greater than a first preset grey scale from the multiple pixels as the target pixel.

In another possible implementation manner, the selecting module 303 may include: a selecting sub-module configured for selecting multiple pixels whose grey scales belong to the target grey scale set from the image; and a determining sub-module configured for, when more than a first number pixels among the multiple pixels constitute a continuous pixel region, taking each pixel in the continuous pixel region as the target pixel, the first number defining a minimum continuous pixel number of background pixels.

In yet another possible implementation manner, the selecting module 303 may include: a selecting sub-module configured for selecting multiple pixels whose grey scales belong to the target grey scale set from the image; and a determining sub-module configured for selecting a pixel whose grey scale is smaller than a second preset grey scale from the multiple pixels as the target pixel.

In yet another possible implementation manner, the selecting module 303 may include: a selecting sub-module configured for selecting multiple pixels whose grey scales belong to the target grey scale set from the image; and a determining sub-module configured for, when less than a second number pixels among the multiple pixels constitute a continuous pixel region, taking each pixel in the continuous pixel region as the target pixel, the second number defining a maximum continuous pixel number of character pixels.

In yet another possible implementation manner, the color inverting module 304 may include: a determining sub-module configured for determining a grey scale of each sub-pixel in the target pixel; and a color inverting sub-module configured for, for each sub-pixel in the target pixel, calculating a difference between a preset maximum grey scale and the grey scale of each sub-pixel, and taking the difference as the grey scale of the sub-pixel after the color inversion so as to invert a color of the target pixel.

In yet another possible implementation manner, the histogram acquiring module 301 is configured for acquiring multiple histograms of the image, the multiple histograms corresponding to multiple colors, and each histogram indicating a pixel number of a corresponding color under each grey scale of the image; the grey scale set acquiring module 302 is configured for, for each of the multiple histograms, obtaining a target grey scale set by using in the histogram a grey scale whose pixel number exceeds a preset pixel number; and the selecting module 303 is configured for selecting a pixel whose grey scale belongs to the target grey scale set from the image to form a pixel set, and taking a pixel respectively included in multiple pixel sets determined according to the multiple histograms as the target pixel.

Any combination of all the above optional technical solutions may form an optional embodiment of the present embodiment, which will not be repeated herein.

Regarding the apparatuses in the above embodiments, the specific operation manners performed by the respective modules have been described in detail in the method embodiments, and will not be elaborated herein.

It should be noted that when processing images using the image processing apparatus provided by the above embodiment, examples are given by illustrating the individual functional modules of these apparatuses. In application, the above functions may be performed by different functional modules, that is, the internal structure of the terminal device may be divided into different functional modules to realize all or part of the above-described functions. Besides, the above embodiments of an image processing apparatus and method belong to the same disclosure concept, and the specific operating procedures of the apparatus may refer to the embodiments of the methods. Therefore, the description thereof will not be repeated herein.

Figure 4:
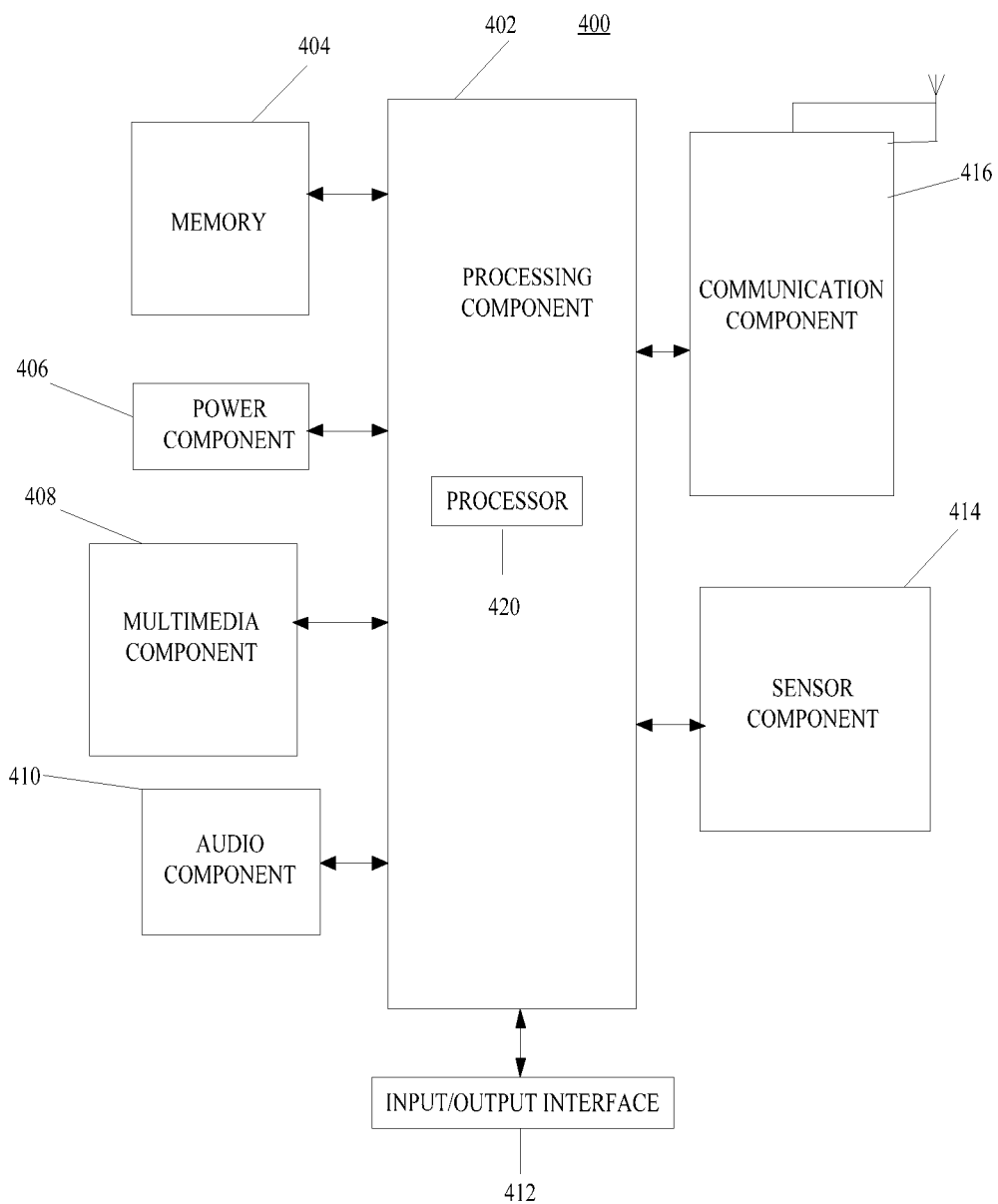
FIG. 4 is a block diagram of an image processing apparatus according to another aspect of the present disclosure.

FIG. 4 is a block diagram of an image processing apparatus 400 according to an exemplary aspect. For example, the apparatus 400 may be a mobile phone, a computer, a digital broadcast terminal, a messaging device, a gaming console, a tablet, a medical device, exercise equipment, a personal digital assistant or the like.

Referring to FIG. 4, the apparatus 400 may comprise one or more following components: a processing component 402, a memory 404, a power component 406, a multimedia component 408, an audio component 410, an input/output (I/O) interface 412, a sensor component 414 and a communication component 416.

The processing component 402 typically controls overall operations of the apparatus 400, such as the operations associated with display, data communications, multimedia operations and recording operations. The processing component 402 may include one or more processors 420 to execute instructions to perform all or part of the steps in the above described methods. Moreover, the processing component 402 may include one or more modules which facilitate the interaction between the processing component 402 and other components. For example, the processing component 402 may comprise a multimedia module to facilitate the interaction between the multimedia component 408 and the processing component 402.

The memory 404 is configured to store various types of data to support the operation of the apparatus 400. Examples of such data comprise instructions for any applications or methods operated on the apparatus 400, various kinds of data, messages, pictures, video, etc. The memory 404 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the apparatus 400. The power component 406 may comprise a power management system, one or more power sources, and any other components associated with the generation, management, and distribution of power in the apparatus 400.

The multimedia component 408 may include a screen providing an output interface between the apparatus 400 and the user. In some embodiments, the screen may comprise a liquid crystal display (LCD) and a touch panel (TP). If the screen includes the touch panel, the screen may be implemented as a touch screen to receive input signals from the user. The touch panel may include one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 408 includes a front camera and/or a rear camera. The front camera and the rear camera may receive an external multimedia datum while the apparatus 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone (MIC) configured to receive an external audio signal when the apparatus 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include but are not limited to a home button, a sound volume button, a start button and a locking button.

The sensor component 414 may include one or more sensors to provide status assessments of various aspects of the apparatus 400. For instance, the sensor component 414 may detect an open/closed status of the apparatus 400, relative positioning of components, e.g., the display and the keypad, of the apparatus 400, a change in position of the apparatus 400 or a component of the apparatus 400, presence or absence of user's contact with the apparatus 400, an orientation or an acceleration/deceleration of the apparatus 400, and a change in temperature of the apparatus 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor or a temperature sensor.

The communication component 416 is configured to facilitate communication, wired or wirelessly, between the apparatus 400 and other devices. The apparatus 400 can access a wireless network based on a communication standard, such as WiFi, 2G, or 3G, or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiment, there is also provided a non-transitory computer-readable storage medium comprising instructions, such as comprised in the memory 404, executable by the processor 420 in the apparatus 400, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium stores executable instructions that, when executed by the processor of a mobile terminal, cause the mobile terminal to execute an image processing method. The method may include: acquiring pixel data of an image to be processed, the pixel data comprising position information and a grey scale of each pixel; acquiring a histogram of the image according to the pixel data, the histogram indicating a pixel number under each grey scale; obtaining a target grey scale set by using in the histogram a grey scale whose pixel number exceeds a preset pixel number; selecting, from the image, a target pixel whose grey scale belongs to the target grey scale set; and performing a color inversion operation to the target pixel.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. An image processing method, comprising:
   acquiring pixel data of an image to be processed, the pixel data comprising position information and a grey scale of each pixel;
   acquiring a histogram of the image according to the pixel data, the histogram indicating a pixel number under each grey scale;
   obtaining a target grey scale set by using in the histogram a grey scale whose pixel number exceeds a preset pixel number;
   selecting, from the image, at least one target pixel whose grey scale belongs to the target grey scale set; and
   performing a color inversion operation to the at least one target pixel, comprising:
   determining a grey scale of each sub-pixel in the target pixel; and
   for each sub-pixel in the target pixel, calculating a difference between a preset maximum grey scale and the grey scale of each sub-pixel, and taking the difference as the grey scale of the sub-pixel after the color inversion so as to invert a color of the target pixel.

2. The method of claim 1, wherein selecting from the image the at least one target pixel whose grey scale belongs to the target grey scale set comprises:
   selecting multiple pixels whose grey scales belong to the target grey scale set from the image; and
   selecting at least one pixel whose grey scale is greater than a first preset grey scale from the multiple pixels as the at least one target pixel.

3. The method of claim 1, wherein selecting from the image the at least one target pixel whose grey scale belongs to the target grey scale set comprises:
   selecting multiple pixels whose grey scales belong to the target grey scale set from the image; and when more than a first number of pixels among the multiple pixels constitute a continuous pixel region, taking each pixel in the continuous pixel region as the target pixel, the first number defining a minimum continuous pixel number of background pixels.

4. The method of claim 1, wherein selecting from the image the at least one target pixel whose grey scale belongs to the target grey scale set comprises:
selecting multiple pixels whose grey scales belong to the target grey scale set from the image; and
selecting at least one pixel whose grey scale is smaller than a second preset grey scale from the multiple pixels as the at least one target pixel.

5. The method of claim 1, wherein selecting from the image the at least one target pixel whose grey scale belongs to the target grey scale set comprises:
selecting multiple pixels whose grey scales belong to the target grey scale set from the image; and
when less than a second number of pixels among the multiple pixels constitute a continuous pixel region, taking each pixel in the continuous pixel region as the at least one target pixel, the second number defining a maximum continuous pixel number of character pixels.

6. The method of claim 1, before performing the color inversion operation to the at least one target pixel, further comprising:
acquiring multiple histograms of the image, the multiple histograms corresponding to multiple colors, and each histogram indicating a pixel number of a corresponding color under each grey scale of the image;
for each of the multiple histograms, obtaining a target grey scale set by using in the histogram a grey scale whose pixel number exceeds a preset pixel number, and selecting a pixel whose grey scale belongs to the target grey scale set from the image to form a pixel set; and
taking a pixel respectively included in multiple pixel sets determined according to the multiple histograms as the target pixel.

7. An image processing apparatus, comprising: a processor, and a memory configured for storing instructions executable by the processor, wherein the processor is configured to:
acquire pixel data of an image to be processed, the pixel data comprising position information and a grey scale of each pixel;
acquire a histogram of the image according to the pixel data, the histogram indicating a pixel number under each grey scale;
obtain a target grey scale set by using in the histogram a grey scale whose pixel number exceeds a preset pixel number;
select, from the image, a target pixel whose grey scale belongs to the target grey scale set; and
perform a color inversion operation to the target pixel, comprising
determining a grey scale of each sub-pixel in the target pixel; and
for each sub-pixel in the target pixel, calculating a difference between a preset maximum grey scale and the grey scale of each sub-pixel, and taking the difference as the grey scale of the sub-pixel after the color inversion so as to invert a color of the target pixel.

8. The apparatus of claim 7, wherein the processor is further configured to:
select multiple pixels whose grey scales belong to the target grey scale set from the image; and
select a pixel whose grey scale is greater than a first preset grey scale from the multiple pixels as the target pixel.

9. The apparatus of claim 7, wherein the processor is further configured to:
select multiple pixels whose grey scales belong to the target grey scale set from the image; and
when more than a first number pixels among the multiple pixels constitute a continuous pixel region, take each pixel in the continuous pixel region as the target pixel, the first number defining a minimum continuous pixel number of background pixels.

10. The apparatus of claim 7, wherein the processor is further configured to:
select multiple pixels whose grey scales belong to the target grey scale set from the image; and
select a pixel whose grey scale is smaller than a second preset grey scale from the multiple pixels as the target pixel.

11. The apparatus of claim 7, wherein the processor is further configured to:
select multiple pixels whose grey scales belong to the target grey scale set from the image; and
when less than a second number pixels among the multiple pixels constitute a continuous pixel region, take each pixel in the continuous pixel region as the target pixel, the second number defining a maximum continuous pixel number of character pixels.

12. The apparatus of claim 7, wherein the processor is further configured to:
acquire multiple histograms of the image, the multiple histograms corresponding to multiple colors, and each histogram indicating a pixel number of a corresponding color under each grey scale of the image;
for each of the multiple histograms, obtaining a target grey scale set by using in the histogram a grey scale whose pixel number exceeds a preset pixel number, and select a pixel whose grey scale belongs to the target grey scale set from the image to form a pixel set; and
taking a pixel respectively included in multiple pixel sets determined according to the multiple histograms as the target pixel.

13. A non-transitory computer-readable storage medium having stored therein instructions that, when executed by a processor of a mobile terminal, causes the mobile terminal to perform an image processing method, the method comprising:
acquiring pixel data of an image to be processed, the pixel data comprising position information and a grey scale of each pixel:
acquiring a histogram of the image according to the pixel data, the histogram indicating a pixel number under each grey scale;
obtaining a target grey scale set by using in the histogram a grey scale whose pixel number exceeds a preset pixel number;
selecting, from the image, a target pixel whose grey scale belongs to the target grey scale set; and
performing a color inversion operation to the target pixel, comprising:
determining a grey scale of each sub-pixel in the target pixel; and
for each sub-pixel in the target pixel, calculating a difference between a preset maximum grey scale and the grey scale of each sub-pixel, and taking the difference as the grey scale of the sub-pixel after the color inversion so as to invert a color of the target pixel.

14. The storage medium of claim 13, wherein selecting from the image the at least one target pixel whose grey scale belongs to the target grey scale set comprises:
   selecting multiple pixels whose grey scales belong to the target grey scale set from the image; and
   selecting a pixel whose grey scale is greater than a first preset grey scale from the multiple pixels as the target pixel.

15. The storage medium of claim 13, wherein selecting from the image the at least one target pixel whose grey scale belongs to the target grey scale set comprises:
   selecting multiple pixels whose grey scales belong to the target grey scale set from the image; and
   when more than a first number pixels among the multiple pixels constitute a continuous pixel region, taking each pixel in the continuous pixel region as the target pixel, the first number defining a minimum continuous pixel number of background pixels.

16. The storage medium of claim 13, wherein selecting from the image the at least one target pixel whose grey scale belongs to the target grey scale set comprises:
   selecting multiple pixels whose grey scales belong to the target grey scale set from the image; and
   selecting a pixel whose grey scale is smaller than a second preset grey scale from the multiple pixels as the target pixel.

17. The storage medium of claim 13, wherein selecting from the image the at least one target pixel whose grey scale belongs to the target grey scale set comprises:
   selecting multiple pixels whose grey scales belong to the target grey scale set from the image; and
   when less than a second number pixels among the multiple pixels constitute a continuous pixel region, taking each pixel in the continuous pixel region as the target pixel, the second number defining a maximum continuous pixel number of character pixels.

* * * * *